United States Patent
Garstang

[15] 3,691,433
[45] Sept. 12, 1972

[54] ALLOYED METAL OXIDE CAPACITOR

[72] Inventor: William W. Garstang, Belgium, Wis.

[73] Assignee: Syncro Corporation, Oxford, Mich.

[22] Filed: Sept. 14, 1970

[21] Appl. No.: 80,516

Related U.S. Application Data

[62] Division of Ser. No. 736,672, June 13, 1968, Pat. No. 3,561,085.

[52] U.S. Cl. ..................................317/230, 317/258
[51] Int. Cl. ..........................H01g 9/04, H01g 3/075
[58] Field of Search.......317/230, 231, 238, 233, 258

[56] References Cited

UNITED STATES PATENTS

| | | | |
|---|---|---|---|
| 1,709,427 | 4/1929 | Bush | 317/230 |
| 1,966,297 | 7/1934 | Jackson | 317/230 |
| 3,028,447 | 4/1962 | Flaschen et al. | 174/113 |
| 3,353,124 | 11/1967 | Dilger | 333/76 |
| 3,548,266 | 12/1970 | Frantz | 317/230 |

*Primary Examiner*—James D. Kallam
*Attorney*—Harness, Dickey and Pierce

[57] ABSTRACT

A novel construction for a nickel oxide capacitor including the use of a novel alloy and a novel method of manufacturing a nickel oxide capacitor.

4 Claims, 4 Drawing Figures

ALLOYED METAL OXIDE CAPACITOR

This application is a division of my copending application Ser. No. 736,672, filed June 13, 1968 which is now U.S. Pat. No. 3,561,085.

BACKGROUND SUMMARY OF THE INVENTION

The present invention relates to metal oxide capacitors and method of manufacturing the same and specifically to the structure and manufacture of nickel oxide capacitors.

In some processes for manufacturing a metal oxide capacitor, a coating of a permeable silver paint is applied to the base metal and then the metal is fired at a relatively high temperature at which an oxide film is formed underneath. This process has been suggested for use with other metals including nickel. In the application of the process, it has been suggested that substantially pure nickel be used. It has been found that it is advantageous, in fact, to use an impure form of nickel and specifically a nickel having a titanium content therein.

At low firing temperatures (between around 700°–1,000°F.) a nickel oxide, $Ni_2O_3$, forms which is undesirable for a dielectric. At a temperature of from around 1,400°–1,800°F. a nickel oxide NiO is formed having a desirable lattice structure which is a good dielectric. It has also been found that after firing the nickel to form NiO a rapid quench will provide a superior dielectric to a slow, air cooled quench.

By use of the above process steps and by including the use of the novel form of nickel, i.e. alloy, an improved process and product have been provided. Therefore, it is an object of the present invention to provide a new and improved process for the manufacture of nickel oxide capacitors.

It is another object to provide a new and improved nickel oxide capacitor construction.

It is still another object of the present invention to provide for a new and improved nickel oxide capacitor construction utilizing an impure form of nickel.

It is another object of the present invention to provide a new and improved nickel oxide capacitor utilizing a nickel alloyed with titanium.

It is still another object of the present invention to provide a novel process utilizing the impure form of the nickel as previously noted in the preceding objects.

It is still another object of the present invention to provide a new and improved process for the manufacture of nickel oxide capacitors in which the article is fired and rapidly quenched.

Other objects, features and advantages of the present invention will become apparent from the subsequent description and the appended claims, taken in conjunction with the accompanying drawings, in which:

Figure 1:
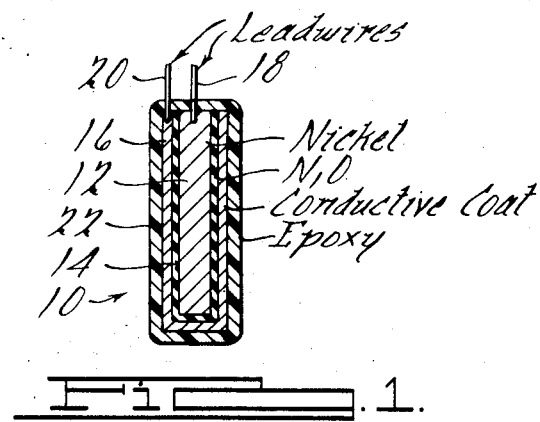
FIG. 1 is a pictorial, sectional view showing a nickel oxide capacitor of a form of the present invention.

In the process used, it has been found advantageous to use an impure form of nickel, i.e., approximately 97 percent pure. When the nickel is alloyed with between 0.2 and 3 percent of titanium, a superior nickel oxide capacitor has resulted. The titanium acts to increase the oxidation rate of the nickel and hence provides for a better resultant nickel oxide dielectric layer; in addition to titanium dioxide formed from the titanium has good dielectric characteristics. It is desirable that the content of harmful components such as silicon be maintained at a minimum, i.e., in total no greater than around 1.2 percent. The silicon content should be preferably no greater than 0.05 percent. In one preferred form an improved nickel oxide capacitor was obtained having the following analysis: silicon 0.05, manganese 0.10, copper 0.02, iron 0.02, aluminum 0.04, magnesium 1.0 and titanium 1.0 with the remainder being nickel. Preferably the total content of impurities aside from titanium should be less than 1.2 percent. With a composition as noted above a nickel oxide capacitor having a capacitance of 400 pico farads at 25° C., was formed having a low dissipation factor (0.1 percent) at 1 megahertz and at 25° C. With a titanium content of less than around 0.2 percent little improvement would be realized. With a titanium content greater than around 3 percent improvement would be realized and in fact degradation of the capacitor could occur.

Looking now to FIG. 1, in the nickel oxide capacitor 10 the center conductor or electrode 12 is the nickel alloy noted above. The dielectric 14 is the compounds formed by oxidation of the alloy in accordance with the present process with the compounds being substantially nickel oxide NiO which has good dielectric properties. A conductive coating 16 is located on the dielectric 14 and lead wires 18 and 20 are connected to the center electrode 12 and outer electrode or coating 16, respectively. The entire structure, except for extensions of lead wires 18 and 20, is encapsulated in a suitable coating 22 such as epoxy. Note that the nickel oxide, NiO, is formed; the other oxides of nickel, $Ni_2O_3$ are not desirable and are avoided in the dielectric coating. The desired nickel oxide, NiO if formed at high temperatures preferably in the range of from 1,400° to 1,800° F.

Figure 2:
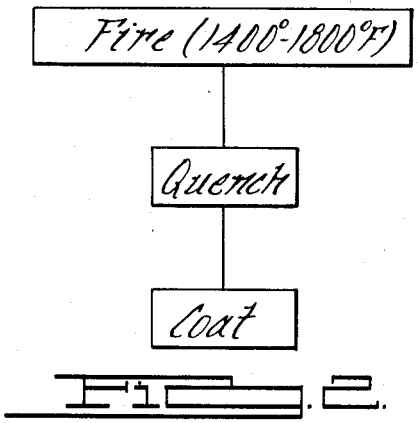
FIG. 2 is a block diagram showing one sequence of steps of the present invention.

As previously noted, it has been suggested that the nickel oxide capacitor 10 be made by first coating a nickel tab or sheet with an oxygen permeable silver coat and then firing in order to form the nickel oxide. In the present invention it has been found that a superior dielectric and hence a superior capacitor can be made by forming the high temperature form of nickel oxide dielectric (NiO) either prior to or both before and after coating. Thus in the present invention, in the first step (see FIG. 2) the nickel tab is heated to a temperature of approximately 1,400° to 1,800° F.; in one form of the invention the tab is heated at 1,650° F. for 2 hours. This firing is preferably done in an oxygen rich atmosphere, and at this temperature, the green high temperature oxide, NiO, is formed. It has been found that if the heated tab is allowed to cool slowly an inferior dielectric results; however, if the tab, while at the elevated temperature, is quenched rapidly a good dielectric results. It has been found that quenching the tabs in not more than around 5 seconds from the time the units are cherry red until essentially they are at a temperature in the order 500°around 500°F. produces satisfactory results.

While satisfactory quenching can be obtained by placing the hot tab on a heat sink, such as a relatively large mass of iron, it has been found advantageous to quench the tabs by immersing them into a liquid bath such as DC 200 silicon oil. The bath should be inert, should not form a reducing or oxidizing agent, and should have good thermal conductivity. A particularly advantageous bath has been found to be perchlorethylene which in addition to the prior characteristics appears to form a gas around the tabs as they are cooled thereby providing a protective environment preventing oxidation or reduction of the high temperature NiO. After quenching it is possible to apply a conductive coating, such as silver, to the NiO surface resulting in a satisfactory capacitor (see FIG. 1). However, in the preferred form additional firing steps are taken.

Figure 3:
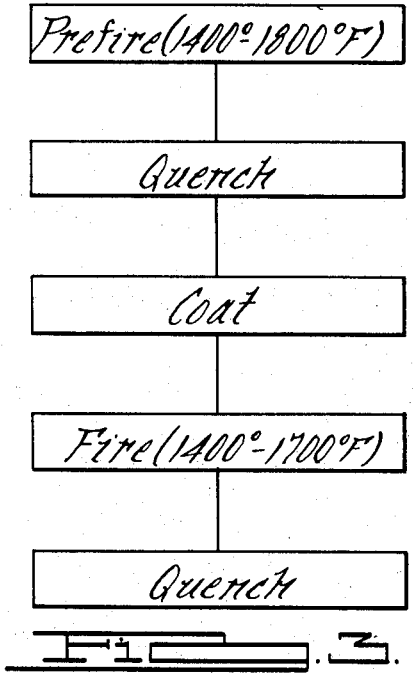
FIG. 3 is a block diagram showing another sequence of steps of the present invention.

It may be that the dielectric coat requires repair and/or further conversion to the high temperature NiO. In this event additional steps can be taken (see FIG. 3). After the prefiring and rapid quenching in perchlorethylene (similar to the first two steps of FIG. 2), an electrode of silver and paladium mixed with a frit, which is an oxygen donor, is applied to the NiO surface with the silver being permeable to oxygen. The frit can be the trioxide of bismuth. The coating is dried at around between 300°-500°F. at which temperature the volatiles are removed from the electrode coating. The tab is then fired at a temperature in the range of around 1400°F. to 1700°F. for a time period ranging between 10 minutes and 2 hours depending upon the results desired and the characteristics of the particular frit system used. At the time the frit has fused and imperfections in the dielectric coating have been healed; next the coated, heated tab is rapidly quenched in perchlorethylene (similar to prior Step 2). The above process steps are preferred and in general result in a better dielectric (see FIG. 3) then that resulting from the process steps of FIG. 2.

Figure 4:
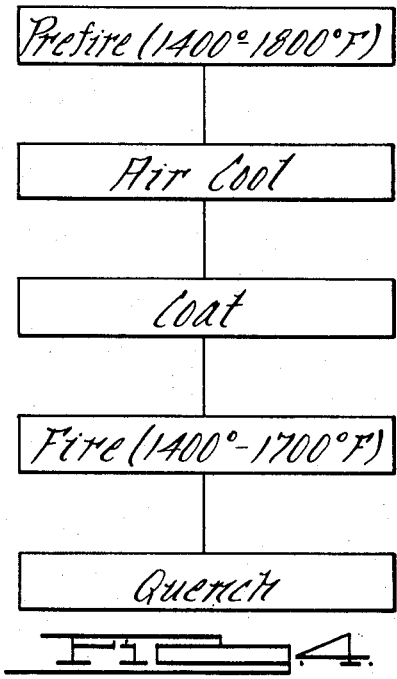
FIG. 4 is a block diagram showing still another sequence of steps of the present invention.

In an alternate process (see FIG. 4) the nickel tab is prefired in an oxygen rich atmosphere (similar to step 1 of FIG. 2) to a temperature in the range of around 1,400°F. to 1,800°F. The tabs are then allowed to slowly cool in air. Next, the silver and paladium mixed with frit are applied to the surface (the frit having an oxygen donor), with the silver coat being permeable to oxygen and the coated tab is fired again in an oxygen rich atmosphere to a temperature in the range of around 1,400° to 1,700°F. for around 70 minutes. It is believed that oxygen permeates through the silver coating and also is obtained from the frit for forming NiO. Now the tab is rapidly quenched, preferably in the liquid perchlorethylene bath resulting in the improved dielectric.

In some instances it may be desirable to impregnate the tabs. In using the DC 200 silicon oil as a quench, impregnation was provided by applying a slight vacuum, i.e., in the order of 200 microns, with the tabs in the oil for approximately 20 minutes. Next the lead wires 18 and 20 are applied to electrodes 12 and 16, respectively. In the final step, the device is encapsulated in a coat 22 by multiple dips in an epoxy to further reduce moisture sensitivity. The result is an improved capacitor construction and a novel method for making the same.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

WHAT IS CLAIMED IS:

1. A solid capacitor comprising: a first electrode being a nickel alloy consisting essentially of nickel and titanium in the range of from about 0.2 percent to around 3 percent titanium, a dielectric formed of nickel oxide on the surface of said first electrode from the material of said first electrode, and a second electrode on said dielectric nickel oxide and electrically separated from the first electrode thereby.

2. The solid capacitor of claim 1 with the titanium in said first electrode being approximately 1 percent.

3. The solid capacitor of claim 1 having a coating for maintaining moisture out of said dielectric.

4. The solid capacitor of claim 3 with said second electrode comprising an oxygen permeable, electrically conductive coating.

* * * * *